(12) United States Patent
Laaspere et al.

(10) Patent No.: US 8,393,697 B2
(45) Date of Patent: Mar. 12, 2013

(54) VARIABLE RESOLUTION IN PRINTING SYSTEM AND METHOD

(75) Inventors: Jaan T. Laaspere, Norwich, VT (US); Brian Walsh, Hanover, NH (US); Sandra Graveson, Enfield, NH (US)

(73) Assignee: FUJIFILM Dimatix, Inc., Lebanon, NH (US)

( * ) Notice: Subject to any disclaimer, the term of this patent is extended or adjusted under 35 U.S.C. 154(b) by 0 days.

(21) Appl. No.: 12/644,699

(22) Filed: Dec. 22, 2009

(65) Prior Publication Data

US 2010/0165031 A1 Jul. 1, 2010

Related U.S. Application Data

(62) Division of application No. 11/220,113, filed on Aug. 31, 2005, now abandoned.

(60) Provisional application No. 60/607,753, filed on Sep. 7, 2004.

(51) Int. Cl.
*B41J 29/38* (2006.01)
(52) U.S. Cl. .................... 347/9; 347/5; 347/19
(58) Field of Classification Search .......... 347/5, 9, 347/19, 40, 41, 14–15
See application file for complete search history.

(56) References Cited

U.S. PATENT DOCUMENTS

| | | | |
|---|---|---|---|
| 4,825,227 A | 4/1989 | Fischbeck et al. | |
| 4,937,598 A | 6/1990 | Hine et al. | |
| 5,265,315 A | 11/1993 | Hoisington et al. | |
| 5,365,843 A | 11/1994 | House et al. | |
| 5,841,552 A | 11/1998 | Atobe et al. | |
| 6,082,911 A | 7/2000 | Murakami | |
| 6,517,182 B1* | 2/2003 | Scardovi | 347/19 |
| 6,702,425 B1* | 3/2004 | Yip et al. | 347/40 |
| 6,837,562 B2* | 1/2005 | Nunokawa | 347/14 |
| 2002/0030848 A1 | 3/2002 | Moriyama et al. | |
| 2003/0002064 A1 | 1/2003 | Otsuki | |
| 2003/0007024 A1 | 1/2003 | Fujimori | |
| 2003/0035030 A1 | 2/2003 | Hamamoto et al. | |
| 2003/0081023 A1* | 5/2003 | Miller et al. | 347/9 |
| 2004/0004649 A1 | 1/2004 | Bibl et al. | |

FOREIGN PATENT DOCUMENTS

| | | |
|---|---|---|
| CN | 1343928 | 4/2002 |
| JP | H2-145358 | 6/1990 |
| JP | H6-8417 | 1/1994 |
| JP | H06-064174 | 3/1994 |
| JP | H8-11298 | 1/1996 |
| JP | 09-118049 A | 5/1997 |
| JP | H9-123431 | 5/1997 |
| JP | 09-118049 | 6/1997 |
| JP | 2000-287075 | 10/2000 |
| JP | 2001-078128 | 3/2001 |
| JP | 2001-205827 | 7/2001 |
| JP | 2002-111947 | 4/2002 |

(Continued)

OTHER PUBLICATIONS

Office action received in co-pending Chinese Application No. 200580030029.3 dated Jul. 15, 2010.

(Continued)

*Primary Examiner* — Lam S Nguyen
(74) *Attorney, Agent, or Firm* — Fish & Richardson P.C.

(57) ABSTRACT

In one aspect, the invention features a method for operating a printing system with variable laydown, including providing the system with print job information, selecting an ink laydown based on the print job information, generating firing instructions for the printing system based on the ink laydown, and printing an image on a substrate at the ink laydown.

22 Claims, 4 Drawing Sheets

FOREIGN PATENT DOCUMENTS

| JP | 2003-011458 | 1/2003 |
|----|-------------|--------|
| JP | 2003-19789 | 1/2003 |
| JP | 2003-191456 | 7/2003 |
| JP | 2003-274162 | 9/2003 |
| JP | 2003-315144 | 11/2003 |
| JP | 2004-82602 | 3/2004 |
| JP | 2004-203054 | 7/2004 |

OTHER PUBLICATIONS

International Preliminary Report on Patentability received in International Application No. PCT/US2005/031733 dated Jul. 14, 2008.
U.S. Provisional Application U.S. Appl. No. 60/607,753, Laaspere et al., filed Sep. 7, 2004.
International Search Report, Application No. PCT/US05/31733.
U.S. Appl. No. 60/510,459, Chen et al.
Office action dated Sep. 28, 2010 issued in counterpart Japanese application No. 2007-531271, 5 pgs.
Office action dated May 17, 2011 issued in Japanese application No. 2007-531271, 7 pgs.
Office action dated Aug. 10, 2011 issued in European application No. 05796089.0, 9 pgs.
Office action dated Nov. 29, 2011 issued in corresponding Japanese application No. 2007-531271, 10 pgs.
Office action dated Jan. 4, 2012 issued in corresponding Chinese application No. 200580030029.3, 19 pgs.
Office action dated Mar. 13, 2012 issued in corresponding Korean application No. 10-2007-7006026, 11 pgs.
Office action dated Mar. 29, 2012 issued in corresponding European application No. 05796089.0, 7 pgs.
Office action dated Aug. 3, 2012 issued in counterpart Chinese application No. 200580030029.3, 11 pages.
Office Action dated Jul. 31, 2012 issued in counterpart Japanese application No. 2007-531271, 2 pages.

* cited by examiner

VARIABLE RESOLUTION IN PRINTING SYSTEM AND METHOD

CROSS-REFERENCE TO RELATED APPLICATIONS

This application is a divisional of U.S. patent application Ser. No. 11/220,113, filed on Aug. 31, 2005, now abandoned which claims priority under 35 USC §119(e) to Provisional Patent Application No. 60/607,753, entitled "VARIABLE RESOLUTION IN PRINTING SYSTEM AND METHOD," filed on Sep. 7, 2004, the entire contents of each of which are hereby incorporated by reference.

TECHNICAL FIELD

This invention relates to printing systems and methods.

BACKGROUND

A printing system, such as a single pass printing system, may be used to print a variety of different inks on a variety of different substrates during the course of its operational lifetime. Typically, a single pass printing system is configured to print at a single resolution in the process direction (i.e., at the native resolution), regardless of the nature of the image (e.g., the ratio of graphics to text), substrate composition, and ink type being used. Accordingly, in some applications, the resolution may be lower than optimal and image errors can occur due to insufficient ink being deposited on the substrate. Alternatively, in other applications, the system's native resolution may be higher than optimal for the print job and image errors can occur due to too much ink being deposited on the substrate. For example, some inks, such as UV curing inks which stay liquid until exposed to curing radiation, can suffer from image quality variability which manifests as a variation in line width for different types of paper.

SUMMARY

One approach to mitigating for image quality variability that can accompany printing on a variety of substrates is to make adjustments in drop mass to compensate for, e.g., different line spread characteristics associated with different paper types. In general, in a first aspect, the invention features a method for operating a printing system with variable laydown, including providing the system with print job information, selecting an ink laydown based on the print job information, generating firing instructions for the printing system based on the ink laydown, and printing an image on a substrate at the ink laydown.

Embodiments of the method can include one or more of the following features and/or features of other aspects. Selecting the ink laydown can include selecting a print resolution based on the print job information and/or selecting a drop mass based on the print job information. A client in communication with the printing system can provide the system with print job information. The client can generate the firing instructions. The printing system can generate the firing instructions from the print job information. The firing instructions can be generated by raster-image-processing the print job information. The firing instructions can be generated based on the selected print resolution. Generating the firing instructions can include generating multiple sets of firing instructions corresponding to the multiple resolutions. Generating the firing instructions can further include selecting one of the multiple sets of firing instructions corresponding to the selected print resolution.

In embodiments where selecting the ink laydown includes selecting a print resolution based on the print job information, the selected print resolution can be between about 100 dots per inch and 2,000 dots per inch. The selected print resolution can be different from a print resolution in a direction orthogonal to the direction of motion. The print resolution can be selected to provide a predetermined print line width on the substrate.

The ink laydown can be selected based on the composition of the substrate and/or the ink used to print the image. The ink laydown can be selected based on a composition of the image. The ink laydown can be selected according to a look up table. The image can be printed according to a substrate tracking signal from an encoder having a native resolution, which can be different than the print resolution.

In general, in another aspect, the invention features a method including causing relative motion between a substrate and a printhead, generating a substrate tracking signal based on a relative position between the substrate and the printhead using an encoder having a native resolution, selecting an ink laydown based on a composition of the substrate, generating a pixel trigger signal based on the substrate tracking signal and the ink laydown, and printing on the substrate with the printhead at the ink laydown.

Embodiments of the method can include one or more of the following features and/or features of other aspects. The ink laydown can correspond to a print resolution different to the native resolution. The pixel trigger signal can be generated using a phase lock loop.

In general, in a further aspect, the invention features a printing system for executing print jobs received from a client. The system includes a print station including a printhead, a substrate transport apparatus for causing relative motion between the print station and a substrate; and a system controller in communication with the print station and the client, wherein during operation the system controller selects an ink laydown based on a print job received from the client, generates firing instructions based on the ink laydown, and causes the printhead to print an image on the substrate at the ink laydown.

Embodiments of the system can include one or more of the following features and/or features of other aspects. The system controller can further include an encoder having a native resolution configured to generate a substrate tracking signal based on the relative position of the substrate and the print head. The system controller can be configured to cause the print head to print on the substrate at a print resolution in the direction of motion different from the native resolution. The system controller can further include a drive pulse controller configured to supply drive pulses to the print head in accordance with print job information received from the client. The drive pulse controller can modulate the drive pulses based on the substrate tracking signal. The drive pulse controller can modulate the drive pulses with a pixel trigger signal having a frequency different from a substrate tracking signal frequency. The drive pulse controller can include a phase lock loop which generates a pixel trigger signal based on the substrate tracking signal. The system controller can include a raster-image-processing processor that generates firing instructions for the drive pulse controller based on the print job information. The control electronics can include a memory buffer for storing firing instructions for the drive pulse controller. The memory buffer can have sufficient memory for storing firing instructions corresponding to multiple print resolutions. The multiple resolutions can be between about 100 dots per inch and 2,000 dots per inch.

In general, in another embodiment, the invention features a controller configured to cause a print head to print on a substrate comprising a memory buffer having.

The controller can be included in the system and/or can be used to implement one or both of the methods.

Embodiments of the invention may include one or more of the following advantages. Embodiments can provide a large range in ink laydown for a printing apparatus. Accordingly, embodiments may allow a range of substrate and ink types to be used on a single printing apparatus without comprising print quality. Laydown can be adjusted based on the composition of the image to be printed, providing consistent image quality for different image compositions. For images including solids, laydown can be adjusted to provide continuous coverage of the substrate as desired. Laydown can be adjusted to reduce (i.e., eliminate) show-through and/or filling in of reverse text. Laydown can be varied through changes made in software, without requiring changes in hardware. Laydown can be varied without adjusting drop mass. The large ink laydown range can increase the tolerance of a printing apparatus with respect to other sources of print errors. A nominal line width can be maintained for different combinations of ink and substrate.

The details of one or more embodiments of the invention are set forth in the accompanying drawings and the description below. Other features and advantages of the invention will be apparent from the description and drawings.

DESCRIPTION OF DRAWINGS

Like reference symbols in the various drawings indicate like elements.

DETAILED DESCRIPTION

In certain aspects, the invention features printing varying ink laydown for different print jobs using a printing system. This can reduce print errors associated with non-optimal ink laydown that can occur when different combinations of substrate and ink are used in the system.

Figure 1:
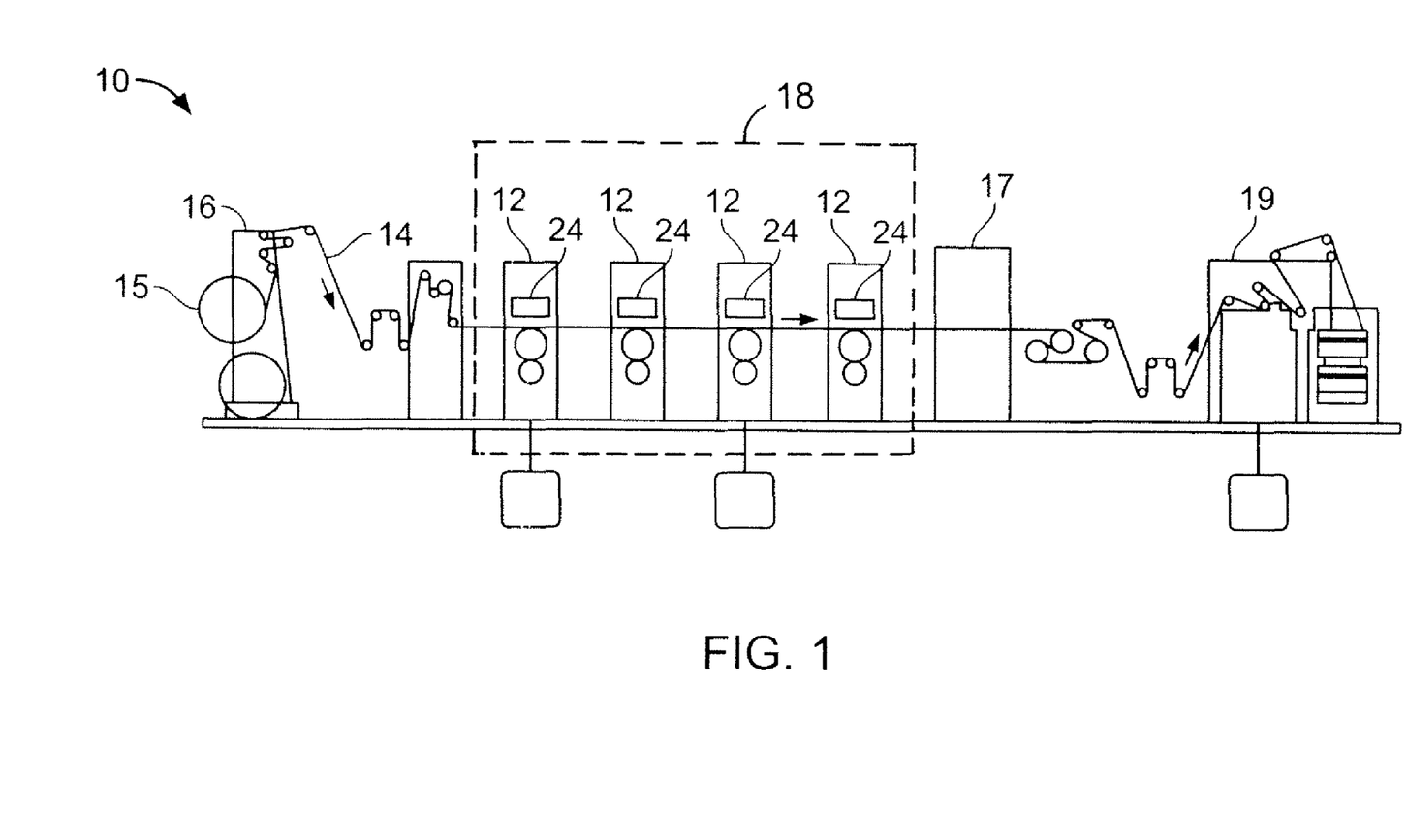
FIG. 1 is a schematic diagram of a continuous web printing system.

Referring to FIG. 1, a continuous web printing system 10 includes a series of stations or printing towers 12 for printing different colors onto a moving web 14. The web 14 is driven from a supply roll 15 on stand 16 onto a paper path that leads sequentially to print stations 12. The four print stations define a print zone 18 in which ink is applied to the substrate. An optional curing station 17 (e.g., an oven or a UV source) may be placed after the final print station. After printing, the web is slit into sheets that are stacked at station 19. For printing wide-format webs, such as newsprint, the print stations typically accommodate a web width of about 25-30 inches or more. A general layout for offset lithographic printing that can be adapted for ink jet printing is further described in U.S. Pat. No. 5,365,843, the entire contents of which is hereby incorporated by reference.

Figure 2:
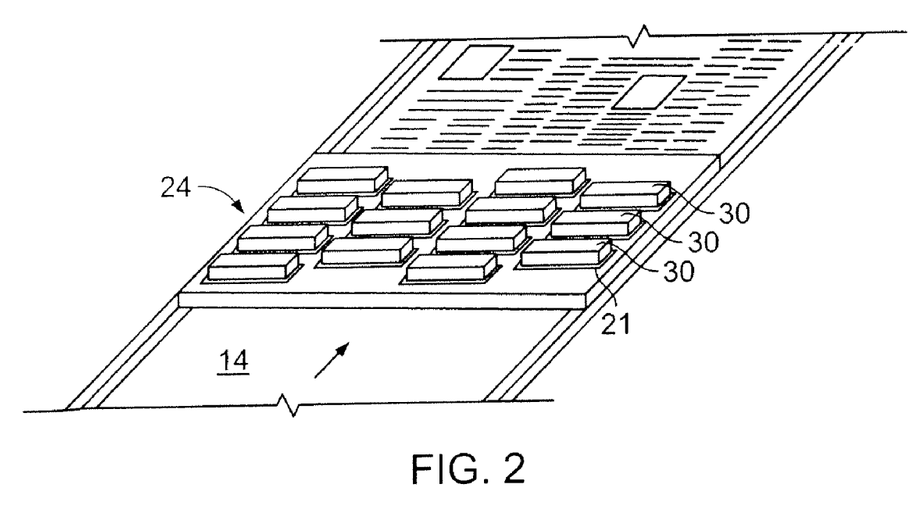
FIG. 2 is a diagram of a print bar housing multiple print heads printing on a continuous web.

Referring as well to FIG. 2, each print station includes a print bar 24. The print bar 24 is a mounting structure for print heads 30 which are arranged in an array and from which ink is ejected to render a desired image on the web 14. The print heads 30 are mounted in print bar receptacles 21 such that the faces (not shown in FIG. 2) of the print heads from which ink is ejected are exposed from the lower surface of the print bar 24. The print heads 30 can be arranged in an array to offset nozzle openings to increase printing resolution or printing speed.

The print heads 30 can be of various types, including drop on demand ink jet print heads with arrays of small, finely spaced nozzle openings (also referred to as orifices). Each orifice is separately controllable to selectively eject ink at desired locations, or pixels, of the image. For example, an ink jet head may have 256 orifices that have spacing for a printing resolution of at least 100 pixels (dots) per inch (dpi) and sometimes far more than that. This dense array of orifices allows complex, highly accurate images to be produced. In high performance print heads, the nozzle openings typically have a diameter of 50 microns or less (e.g., around 25 microns), are separated at a pitch of 25-300 nozzles/inch, have a resolution of 100 to 3000 dpi or more, and provide drop sizes of about 2 to 50 picoliters or less. Drop ejection frequency is typically 10 kHz or more. Examples of drop-on-demand piezoelectric print heads are described in Fishbeck et al., U.S. Pat. No. 4,825,227; Hoisington, U.S. Pat. No. 5,265,315; Hine, U.S. Pat. No. 4,937,598; Bibl et al., U.S. Patent Application Publication No. US-2004-0004649-A1; and, Chen et al., U.S. Provisional Patent Application No. 60/510,459, the entire contents of all of which are incorporated herein by reference. Other types of print heads can be used, such as, for example, thermal inkjet print heads in which heating of ink is used to effect ejection. Continuous ink jet heads, that rely on deflection of a continuous stream of ink drops can also be used. In typical arrangement, the stand off distance between the web path and the print bar is between about 0.1 and one millimeter.

Ink laydown refers to the volume (or equivalently, mass) of ink per unit area of the substrate. Ink laydown can be varied by varying print resolution and/or drop mass. Cross-web print resolution is determined by the spacing of nozzles that print to adjacent print lines on the substrate (i.e., functionally adjacent nozzles). Functionally adjacent nozzles may be on the same or different print heads. Typical cross-web resolution can be between about 100 dpi and 1000 dpi (e.g., from about 300 or more, 400 dpi or more, 500 dpi or more, 600 dpi or more, 700 dpi or more, 800 dpi or more). Process direction resolution depends on the jetting frequency and web velocity. In many embodiments, the jetting frequency is locked to the web velocity by an encoder, which is described below. Process direction resolution can be the same for each print job or can vary for different print jobs. Typically, process direction resolution is between about 100 dpi and 2,000 dpi (e.g., between about 300 dpi and 1,000 dpi, such as about 600 dpi). Methods for implementing different process directions resolutions are described below.

Drop mass can be varied by modifying the drive waveform (e.g., amplitude and/or shape of the drive waveform) for a print head and/or by jetting multiple drops to a pixel location. For example, in general, the larger the amplitude of the pulse, the larger the jetted drop mass. In some embodiments, drop mass can be varied by about five percent or more, depending on the desired laydown (e.g., about 10 percent or more, about 15 percent or more, about 20 percent or more).

In some embodiments, both drop mass and process direction resolution are varied to vary ink laydown. Process direction resolution can be varied to provide large scale laydown adjustment (e.g., about 100 percent or more, about 200 percent or more, about 300 percent or more, about 500 percent or more), while drop mass is varied to provide fine scale laydown adjustment (e.g., about 50 percent or less, about 25 percent or less, about 10 percent or less, about five percent or less).

Figure 3:
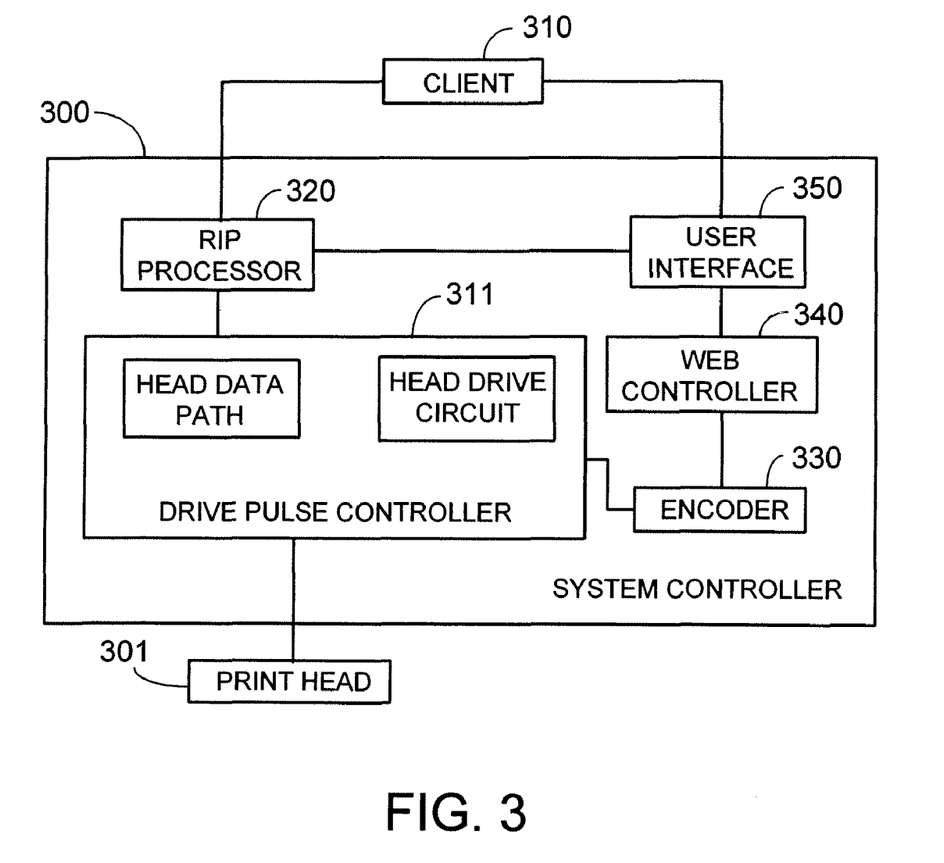
FIG. 3 is a block diagram of a system controller.

Referring to FIG. 3, a system controller 300 controls the operation of printing system 100. System controller 300 communicates with a client 310, which provides the controller with print job information. Typically, the client is a remote computer with, for example, desktop publishing capabilities that are used to compile the print job. System controller includes a raster-image-processing (RIP) processor 320, which generates firing instructions for a print head 301. System controller sends the firing instructions to print head 301 via a drive pulse controller 311 (which includes a head data path and a head drive circuit). Drive pulse controller 311 sends firing instructions to print head 301 with a pixel trigger signal. System controller 300 also includes an encoder 330, which tracks the location of the web relative to print head 301 and provides drive pulse controller 311 with a substrate tracking signal. Drive pulse controller 311 generates the pixel trigger signal based on the substrate tracking signal. Encoder 330 is in communication with a web controller 340, which controls the relative motion of the web through the printing system. Both web controller 340 and RIP processor 320 are in communication with a user interface 350, from which an operator can input instructions to system controller 300.

As mentioned previously, process direction resolution is related to the jetting frequency and the web velocity, both of which are controlled by the system controller. In particular, process direction resolution is proportional to the ratio of jetting frequency to web velocity. As discussed previously, the encoder tracks the position of the web relative to the print head and generates a substrate tracking signal, which the system controller uses to gate firing instructions being sent to the print head. The encoder has a native resolution corresponding to a web displacement between substrate tracking signal pulses. For example, an optical encoder that includes a web drive shaft having a number of radial slits configured to interrupt a beam between an optical source and detector generates a substrate tracking signal pulse each time the beam is interrupted. Accordingly, each pulse corresponds to displacement of the web that depends on the radius of the shaft. Where the system uses the substrate tracking signal pulses to gate the firing instructions the web direction resolution will correspond to the displacement.

Process direction resolution is not fixed to the native resolution. The resolution may vary depending on the print job. To accommodate resolutions different from the native resolution, the system controller generates a pixel trigger signal based on the substrate tracking signal and the selected resolution. The pixel trigger signal is subsequently used to gate the firing instructions, thereby providing the appropriate delay between printing rows of pixels to print at the selected resolution.

In some embodiments, the pixel trigger signal can be produced from the substrate tracking signal using a phase-lock loop, which scales the frequency of the substrate tracking signal to provide a pixel trigger signal having a frequency corresponding to the selected resolution.

In some embodiments, the native resolution can be larger (e.g., 5-20 times larger) than a range of selected resolutions. For example, where the selected resolution is typically between about 100 and 1,000 dpi, the native resolution can correspond to about 5,000, 10,000, 20,000 dpi or more.

Alternatively, instead of generating a pixel trigger signal different from the substrate tracking signal, in some embodiments, multiple encoders (each having a different native resolution) can be used. For example, a system can include three (or more) different encoders providing three (or more) native resolutions. The system controller can select and use the substrate tracking signal corresponding to the selected resolution for gating the firing instructions.

In some embodiments, the system controller includes a database of paper and ink types and corresponding process direction resolutions that provide optimal image quality for various ink/paper combinations. This information can be stored in, e.g., a lookup table format. The system controller can refer to this database to determine optimal laydown, and can select a process direction resolution and/or drop mass to provide optimal laydown for each print job.

Laydown can be varied depending on the substrate and ink being used and depending on the composition of the image. Generally, an image can be composed of solids, graphics and/or text, and the laydown can be varied depending on a desired balance between solids, graphics and text quality in the printed image. Ink laydown can affect print line width, which is the physical dimension of a deposited ink line in the cross-web direction. To print good solid images, for example, the print line width should be equal to or greater than the pixel width (e.g., about 1.5 or more times the pixel width, about 2 or more times the pixel width, about 2.5 or more times the pixel width, about 3 or more times the pixel width), so that ink printed on adjacent pixels merges to provide continuous ink coverage of the substrate. In certain embodiments, the print line width should be sufficiently large to hide print errors, such as those errors due to variations between different nozzles (e.g., nozzle position, nozzle alignment) or substrate motion quality (e.g., web weave). Where the print line width is not sufficiently large to provide continuous coverage, the image may appear streaky. On the other hand, where an application calls for printing, e.g., fine text, small bar codes, or reverse text (i.e., where the ink forms the background and characters are defined by ink-free regions), a large print line width (e.g., pixel size or larger) can result in poor text quality due to unwanted filling of non-printed areas.

Different substrates can respond differently to a given ink laydown with the resultant line width varying widely. For example, an absorptive substrate (e.g., copy or matte paper) can result in a large line width compared to a non-absorptive substrate (e.g., gloss paper), e.g., about 50%-200% larger, for the same drop volume and process direction resolution. Accordingly, to achieve comparable line widths, a printing apparatus should print a non-absorptive substrate at a higher process direction resolution that an absorptive substrate. Note, however, that image quality can vary for different substrates with comparable line widths. For example, the optical density of an image on gloss paper can be significantly higher than that of copy paper for comparable line widths. Thus, laydown can be selected based on the ink/substrate combination and the type of image being printed (e.g., amount of text vs. amount of graphics vs. amount of solids).

In some embodiments, print line width may be maintained at a substantially constant nominal value for different combinations of substrate and ink. For example, print line width can be maintained within about 20 percent or less of a nominal line width (e.g., about 15 percent or less, about 10 percent or less, about 5 percent or less). The nominal line width can be about equal to the pixel width or more (e.g., about 1.5 or more times the pixel width, about 2 or more times the pixel width, about 2.5 or more times the pixel width, about 3 or more times the pixel width). In some embodiments, the nominal line width can be about 30 µm or more (e.g., about 50 µm or more, about 80 μm or more, about 100 μm or more, about 150 μm or more, about 200 μm or more).

Figure 4A:
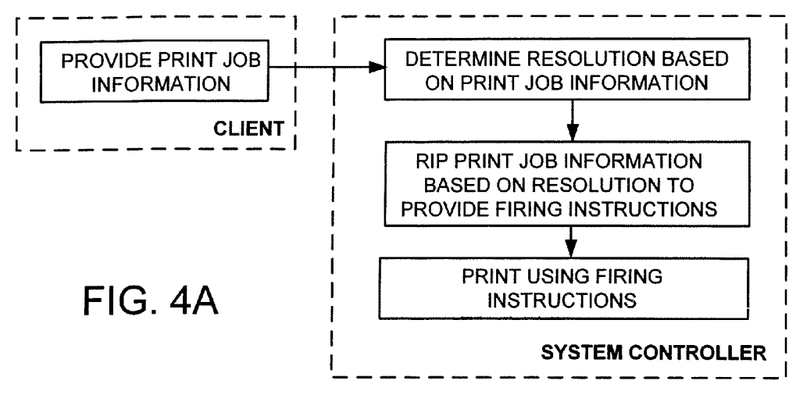
FIG. 4A-4C are flow diagrams of embodiments of control processes for operating a printing system at different process direction resolutions.

A flow-chart illustrating the operation of system 100 is shown in FIG. 4A. Initially, client 310 sends print job information to system controller 300. The system controller determines the process direction resolution based on the characteristics of the print job (e.g., the nature of the image to be printed, such as the ratio of text to graphics, and the type of substrate and ink to be used). Once the web-direction resolution is determined, the system controller RIPs the print job information to provide firing instructions. Finally, the print job is executed as the system prints using the firing instructions, which are gated using the pixel trigger signal.

In the described embodiment, the system controller RIPs the print job information to generate firing instructions. However, the division of tasks between the client and system controller can be different from the mode of operation previously described. For example, in some embodiments, rather than sending print job information to the system controller, the client can RIP the print job information and send firing instructions instead.

Figure 4B:
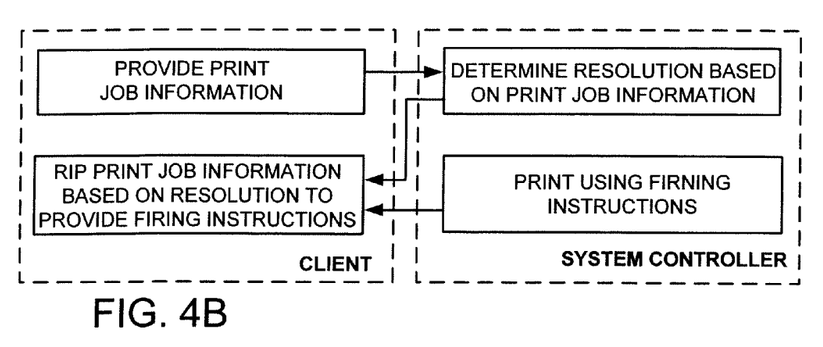

An example of this mode of operation is shown in FIG. 4B, where the client sends print job information to the system controller. Instead of RIP-ing the print job data, the system controller determines which resolution to use and provides this information back to the client. The client then RIPs the print job information according to the selected resolution, thereby generating firing instructions that are sent to the system controller. The system controller executes the print job according to the firing instructions.

Figure 4C:
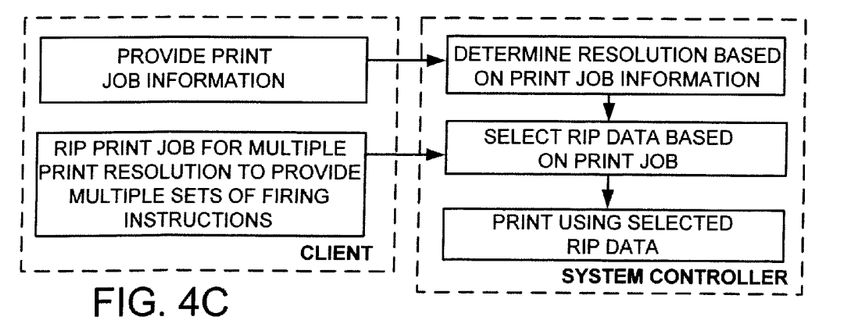

A further example of an alternative mode of operation is shown in a flow diagram in FIG. 4C. In this embodiment, the client provides the system controller with the print job information and RIPs the print job information to provide multiple sets of firing instructions (e.g., three, four, five or more sets) at multiple print resolutions. For example, the client could RIP the print job information to provide firing instructions for printing at 300 dpi, 600 dpi, and 900 dpi. The system controller selects an appropriate resolution for the print job based on the print job information and receives the corresponding firing instructions from the client. The print job is executed at the selected resolution with the corresponding firing instructions.

Alternatively, the multiple sets of firing instructions can be sent to the system controller along with the print job information. The multiple sets of firing instructions are buffered to memory. Only the firing instructions corresponding to the selected resolution are accessed for executing the print job. In this instance, the memory buffers in the system controller should be sufficiently large to store the multiple sets of firing instructions (e.g., two sets, three sets, four sets, five sets or more). For example, where the image corresponds to about 10 megabytes of memory and three sets of firing instructions are generated, the memory buffer capacity should be about 30 megabytes or more. In some embodiments, the memory buffers can be about 1 gigabyte or more (e.g., about 3 gigabytes or more, about 5 gigabytes or more, about 10 gigabytes or more, about 20 gigabytes or more, about 50 gigabytes or more.

Jetting frequency is controlled by system controller via the pixel trigger signal and is typically limited by these electronics and/or by physical and electrical properties of the print heads. Jetting frequency can vary from about 5 kHz to about 100 kHz, for example. In some embodiments, jetting frequency is between about 15 kHz to 25 kHz.

Web velocity is also controlled by the system controller via the web controller. Minimum web velocity is typically limited by the web-handling apparatus' ability to keep the web stable. At very low velocities the web-handling apparatus can introduce web motions that result in drop placement errors. Such vibrations can also occur at very high velocities, although maximum web velocity is often determined by one of the process steps, such as a minimum dwell time of the web within one of the stations. One example of this is for UV curing ink, where the maximum web velocity can be determined according to the minimum exposure required to adequately cure the ink. In some embodiments, web velocity can be varied between about 0.1 $ms^{-1}$ and 10 $ms^{-1}$ (e.g., between about 1 $ms^{-1}$ and 3 $ms^{-1}$).

A number of embodiments of the invention have been described. Nevertheless, it will be understood that various modifications may be made without departing from the spirit and scope of the invention. Other embodiments are within the scope of the claims.

What is claimed is:

1. A method comprising:
receiving, at a printing system, information about a print job, the information identifying a composition of a substrate and a characteristic of an ink associated with a spreading of the ink on substrates;
selecting a size of a droplet, to be jetted by a jet of the printing system, based on the composition of the substrate and the characteristic of the ink, the size of the droplet being selected based on a look up table, the look up table comprising a database of substrate and ink types and corresponding process direction resolutions that optimize image quality for each combination of substrate and ink type, and
generating firing instructions for the printing system based on the selected size of the droplet, wherein selecting the size of the droplet comprises providing fine scale laydown adjustments.

2. The method of claim 1 further comprising selecting a print resolution based on the information about the print job.

3. The method of claim 2, wherein the firing instructions are generated based also on the selected print resolution.

4. The method of claim 2, wherein the print resolution is selected for large scale ink laydown adjustment.

5. The method of claim 1, wherein selecting the size of the droplet comprises selecting a drop mass.

6. The method of claim 1, wherein selecting the size of the droplet comprises selecting a size from among possible sizes of the droplet that the jet is capable of jetting.

7. The method of claim 1, wherein generating the firing instructions comprises generating different firing instructions corresponding to different resolutions that the printing system is capable of printing.

8. The method of claim 7, wherein generating the firing instructions further comprises selecting one of multiple sets of firing instructions corresponding to a selected print resolution.

9. The method of claim 1, wherein the printer is capable of printing at multiple resolutions ranging between about 100 dots per inch and 2,000 dots per inch.

10. The method of claim 1, wherein the information about the print job also identifies a composition of an image.

11. The method of claim 1, wherein selecting the size of the droplet comprises selecting based on an absorptive feature of the substrate.

12. The method of claim 1, wherein the information identifying the composition of the substrate and the characteristic of the ink associated with the spreading of the ink on substrates comprises a combination of the ink and the substrate used.

13. A printing system comprising:
a printhead;
a transporter to cause a relative motion between the printhead and a substrate; and
a jet controller in communication with the printhead and configured to select a size of a droplet of ink to be jetted by a jet of the printhead based on a composition of the substrate and a characteristic of the ink, and to generate firing instructions based on the selected size of the droplet, the jet controller comprising a database of substrates and ink types and corresponding process direction resolutions that optimize image quality for each combination of substrate and ink type.

14. The system of claim 13, wherein the jet controller further comprises an encoder having a native resolution configured to generate a substrate tracking signal based on the relative motion of the substrate and the printhead.

15. The system of claim 14, wherein the jet controller further comprises a drive pulse controller to supply drive pulses to the printhead in accordance with print job information.

16. The system of claim 15, wherein the drive pulse controller modulates the drive pulses based on the substrate tracking signal.

17. The system of claim 15, wherein the drive pulse controller comprises a phase lock loop which generates a pixel trigger signal based on the substrate tracking signal.

18. The system of claim 15, wherein the jet controller comprises a raster-image-processing (RIP) processor that generates the firing instructions for the drive pulse controller based on the print job information.

19. The system of claim 13, wherein the jet controller further comprises a memory buffer for storing the firing instructions.

20. The system of claim 13, wherein the jet controller further comprises a database containing information about compositions of substrates and characteristics of inks.

21. A method comprising:
based on a print job received at a printing system, selecting a size of a droplet, to be jetted by a jet of a printing system, based on a composition of a substrate and a characteristic of an ink, the size of the droplet being selected based on a look up table, the look up table comprising a database of substrate and ink types and corresponding process direction resolutions that optimize image quality for each combination of substrate and ink type, the size of the droplet being selected to be optimal for the image quality for each combination of the substrate and the ink, wherein selecting the size of the droplet comprises providing fine scale laydown adjustments.

22. A printing system comprising:
a printhead; and
a jet controller in communication with the printhead and configured to select a size of a droplet of ink to be jetted by a jet of the printhead based on a composition of the substrate and a characteristic of the ink, the jet controller comprises a database of substrates and ink types and corresponding process direction resolutions that optimize image quality for each combination of substrate and ink type, the size of the droplet of ink being selected to optimize the image quality for each combination of the substrate and the ink.

* * * * *